United States Patent
Hall

(10) Patent No.: US 6,390,154 B1
(45) Date of Patent: May 21, 2002

(54) PORTABLE LEVEE SYSTEM AND PORTABLE LEVEE SYSTEM BAG

(75) Inventor: David K. Hall, Lebanon, KY (US)

(73) Assignee: Westwind Levee Systems, LLC, Lebanon, KY (US)

( * ) Notice: Subject to any disclaimer, the term of this patent is extended or adjusted under 35 U.S.C. 154(b) by 0 days.

(21) Appl. No.: 09/621,425

(22) Filed: Jul. 21, 2000

(51) Int. Cl.$^7$ ................................................. E02B 3/00
(52) U.S. Cl. ......................... 141/314; 383/24; 383/37; 383/38; 383/32; 383/84; 383/907; 405/21; 405/107; 405/111; 405/114
(58) Field of Search .............................. 383/22, 24, 32, 383/37, 38, 84, 907; 405/15, 18–21, 107, 110–112, 114–117; 141/314, 313–317, 231

(56) References Cited

U.S. PATENT DOCUMENTS

| | | | |
|---|---|---|---|
| 1,418,403 A | * 6/1922 | Smith | 383/38 |
| 1,475,603 A | * 11/1923 | Sheridan | 383/38 |
| 1,983,418 A | * 12/1934 | Thurmer | 383/38 |
| 2,767,963 A | 10/1956 | Ringen et al. | |
| 2,813,704 A | 11/1957 | MacKissic | |
| 3,886,751 A | * 6/1975 | Labora | 405/107 |
| 4,184,522 A | 1/1980 | Waite | |
| 4,362,433 A | * 12/1982 | Wagner et al. | 405/107 |
| 4,650,368 A | * 3/1987 | Bayer | 405/111 |
| 4,784,520 A | * 11/1988 | Stevens | 405/21 |
| 5,244,019 A | 9/1993 | Derby | |
| 5,425,403 A | 6/1995 | Hermann | |
| 5,443,102 A | 8/1995 | Svendsen | |
| 5,509,229 A | * 4/1996 | Thomasson et al. | 47/21 |
| 5,538,155 A | * 7/1996 | Hoekstra | 220/403 |
| 5,584,599 A | * 12/1996 | Knittel | 405/15 |
| 5,771,665 A | 6/1998 | Nelson et al. | |
| 5,894,871 A | 4/1999 | Greer | |
| 5,901,762 A | 5/1999 | Rollins | |
| 5,971,661 A | * 10/1999 | Johnson et al. | 405/114 |
| 5,988,237 A | 11/1999 | Bedsole | |
| 6,126,362 A | * 10/2000 | Carter et al. | 405/114 |

* cited by examiner

Primary Examiner—J. Casimer Jacyna
(74) Attorney, Agent, or Firm—John F. Salazar; Charles G. Lamb; Middleton Reutlinger

(57) ABSTRACT

A portable levee system includes a bag having a preselected geometric shape. The bag is continuous in that it has a length at least equal to its width, and is preferably many times as long. A top portion of the bag is open for receiving fill material. A preferred geometric shape is a trapezoid. The bag is removably mounted to a dispenser and the dispenser dispenses the bag from a rear portion of the dispenser. A preferred dispenser is towed behind a tractor or truck and the bag is filled within the dispenser and deposited onto the ground. A method of providing a portable levee is taught wherein a levee is created in a fraction of the time required to build an equivalently-sized levee utilizing current emergency levee construction systems.

17 Claims, 6 Drawing Sheets

PORTABLE LEVEE SYSTEM AND PORTABLE LEVEE SYSTEM BAG

BACKGROUND OF THE INVENTION

1. Technical Field

This invention relates to a portable levee system and portable levee system bag. More particularly, this invention relates to both a trapezoidal-shaped continuous bag that is fed from a container to the ground and receives fill material, and a method for employing same to provide a levee as well as the levee system bag used.

2. Relevant Art

Common military-issue style sandbags have been used for years in flood control. A typical, but labor-intensive and time consuming, use of such sandbags is to utilize shovels to scoop up sand and deposit the sand into manually held open sandbags. One current device which utilizes such military sandbags includes a bin with three openings formed in the bottom to allow simultaneous filling of three regular sand bags at once. Sand is dumped in the bin and three users hold empty bags under the openings to receive the sand as it flows down through the openings. Another present device is a conveyor that attaches behind a dump truck. It feeds sand out, left and right, to chutes underneath and into bags manually held in place for filling.

Over 20,000,000 conventional sandbags were filled by hand and emplaced as levees along riverbanks during the spate of river floods which occurred in the 1990's. The use of hand-filled sandbags is inefficient when done on such a necessarily large scale. Augmenting such hand-filling operations were untold numbers of bulldozers, bob-cats, and the like, in order to provide sand and other fill material. Such a major commitment of resources in manpower and equipment was still not enough to stem the flow of river water through mid-America. Thus, what is needed is a portable levee system which features a bag that can be quickly and efficiently emplaced, is easy to use, and is sturdy.

SUMMARY OF THE INVENTION

It is an object of the present invention to provide a portable levee system for use in flood control.

A further object of the present invention is to provide a portable levee system including a continuous collapsible bag stored in a container and dispensed for filling.

Another object of the present invention is to provide a portable levee system including bags which can be continuously dispensed and filled from a moving vehicle.

It is an even further object of the present invention to provide a portable levee system including a trailer for dispensing a continuous bag, and an auger for picking up and depositing fill material into the bag along a path of travel of the dispensing trailer.

Yet another object of the present invention is to provide a method of making a portable levee.

More particularly, and in accordance with the structure and the method of operation hereinafter discussed, the present invention provides a levee which can be constructed in a fraction of the time required to build an equivalently-sized levee utilizing current emergency levee construction systems.

Specifically, the present invention provides a continuous bag design which includes lateral webs formed therein to hold the bag to a preselected geometric shape. A preferred bag shape is trapezoidal, whereby the bag has a largest dimension at a base when viewed from an end. Guide sleeves containing a rope of sufficient diameter to keep the guide sleeve in the bag guides are sewn along two upper edges of the bag and fed into a pair of bag guides, each bag guide having two rails, thereby holding the bag in position for filling. The continuous bag is stored in a container, either on a roll, or compressed therein, accordion-style. In either storage method, a dispenser, for example a trailer, dispenses the bag from the container and onto the ground. While the bag is being paid out, available fill material, such as, for example, sand, gravel, or rocks is deposited into the bag. One embodiment of the present invention relies on the use of a bob-cat, or similar loader to lift and deposit fill material into the bag. However, a preferred embodiment utilizes an auger system including a chute that transports fill material via the auger system into an opening defined by the two upper edges and formed at a top of the bag. The fill material is deposited onto a grate or screen which is suspended over the opening whereby the grate sifts the fill material, as desired, in order to provide a uniform consistency of fill material. The auger system operates in conjunction with a dump truck, trailer, or other transport means for delivering fill material to the dispenser.

Although the present invention can be deposited on-site and remain stationary, a preferred dispenser is a wheeled or tracked vehicle such as, for example, a trailer or a self-propelled vehicle. Likewise, a preferred auger system is wheeled or tracked. Alternatively, the auger system can be lowered onto a support surface, such as, for example, the ground, whereby the auger system brings fill material up to the bag from the ground directly in its path and alongside the path of the dispenser. The latter option is most readily foreseen when filling sandbags near a river or stream bank, and soft mud/dirt along the bank is to be used for filling the bags. A typical base dimension for the bag is six feet across, but any dimension can be used.

Additional objects and advantages of the invention will become apparent to those skilled in the art from the following written description and the figures relating thereto.

BRIEF DESCRIPTION OF THE DRAWINGS

A better understanding of the invention will be had upon reference to the following description in conjunction with the accompanying drawings in which like numerals refer to like parts throughout the several views and wherein.

DETAILED DESCRIPTION OF THE PREFERRED EMBODIMENT

Figure 1:
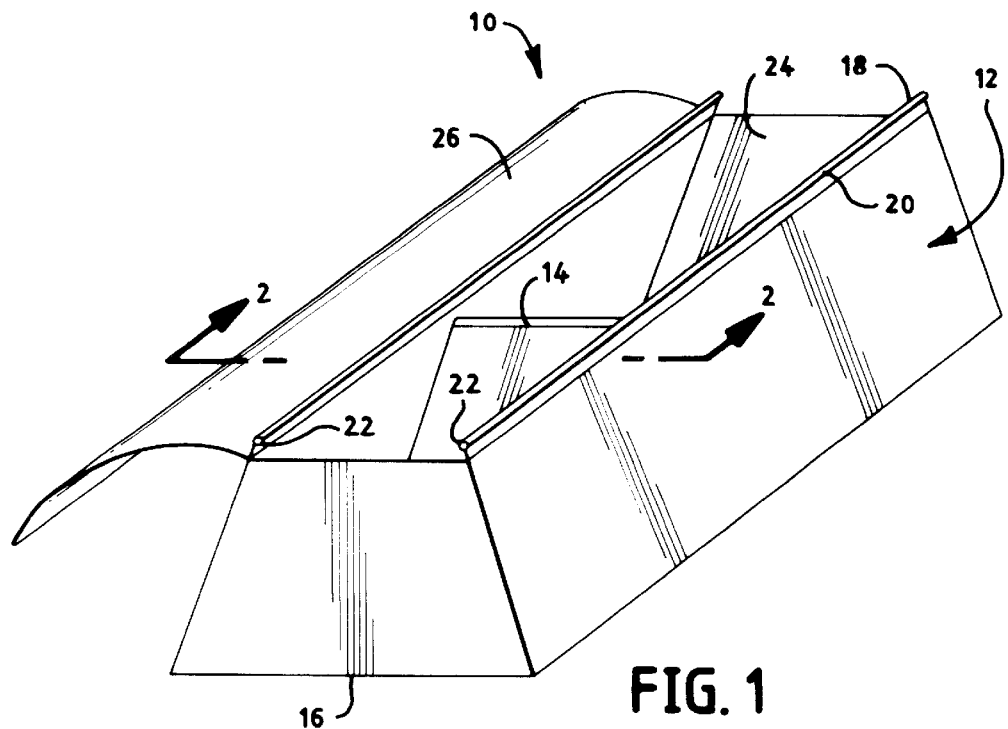
FIG. 1 is a perspective view of a sandbag of a preferred embodiment of a portable levee system of the present invention.
Figure 2:
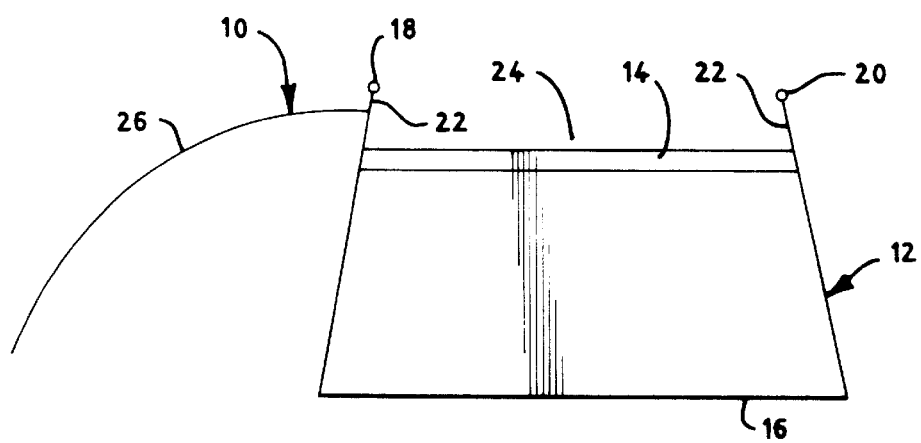
FIG. 2 is a sectional view taken along line 2—2 of the sandbag of FIG. 1.

In the Figures is shown a portable levee system 10. FIGS. 1 and 2 show a bag 12 which is continuous in that it has a length at least equal to its width, and preferably a length substantially greater than its width. The bag 12 includes one or more lateral webs 14 formed therein to define a preselected geometric shape. A preferred bag 12 shape is trapezoidal, whereby the bag 12 has a greatest dimension at a base 16 when viewed from an end. Guide sleeves 18, containing guide ropes 20, are sewn along two upper edges 22 of the bag 12. The two upper edges 22 define an opening 24. The bag 12 has a flap 26 hingedly attached to one side of the opening 24 and the flap 26 is of sufficient length and width to cover the opening 24 when in a closed position thereby sealing the sandbag 12.

Figure 3:
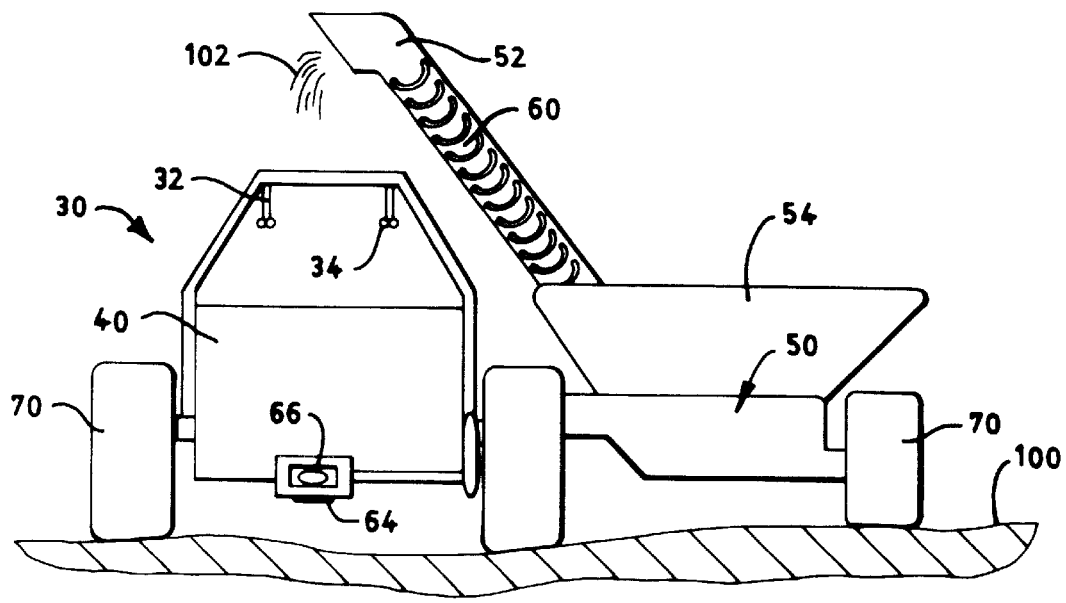
FIG. 3 is a front view of a portable levee system of the present invention.
Figure 4:
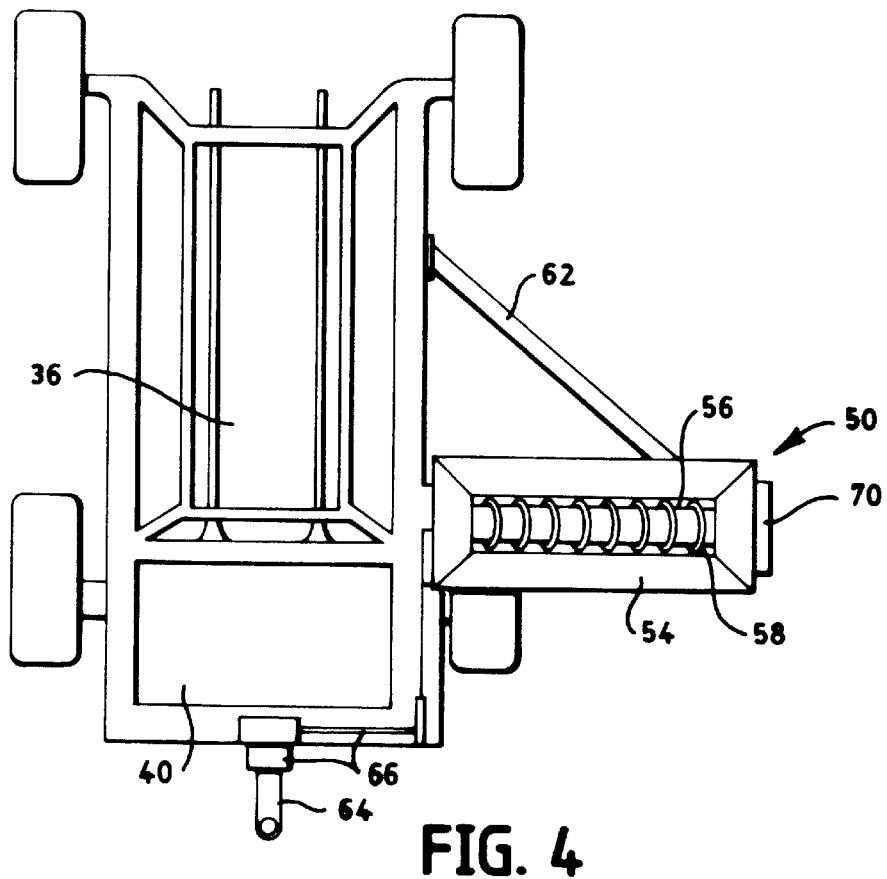
FIG. 4 is a top view of a portable levee system of the present invention.
Figure 5:
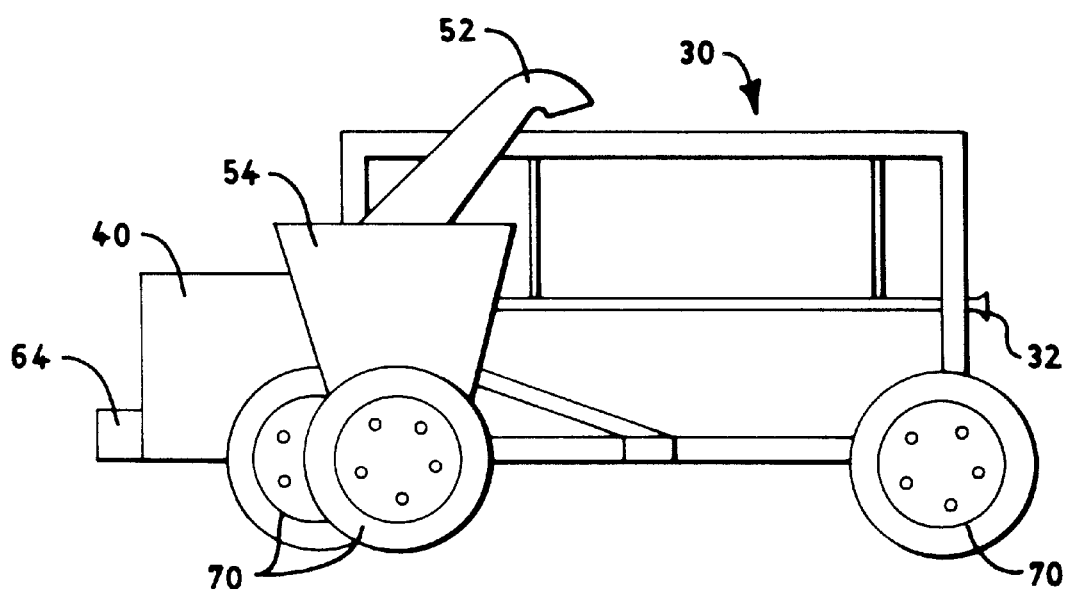
FIG. 5 is a side view of a portable levee system of the present invention.

As shown in FIGS. 3–5, a dispenser 30 includes a pair of bag guides 32, each bag guide has two rails 34, whereby the guide sleeves 18 are retained by the rails 34, thereby holding the bag 12 in position for filling. The continuous bag 12 is collapsibly disposed within a container 40, either on a roll, or compressed therein, accordion-style. The container 40 has an opening through which the bag 12 may pass as bag 12 is paid out. The container 40 is mounted on a forward portion of the dispenser 30 and the bag guides 32 are disposed immediately adjacent to an upper portion of the container 40 and running rearward from the container 40. In this fashion, the bag guides slidably receive the guide sleeves 18. The dispenser 30 such as, for an example shown in the Figures, a trailer, dispenses the bag 12 from the container 40 and onto a support surface 100, such as, for example, a river shoreline, or other geographical terrain. While the bag 12 is being paid out, available fill material 102, such as, for example, sand, gravel, or rocks is deposited therein.

One embodiment of the present invention relies on the use of a bob-cat, or similar loading equipment to lift and deposit fill material 102 into the bag 12. However, a preferred embodiment includes an auger system 50 including a chute 52 that transports fill material 102 via the auger system 50 into the opening 24 of the bag 12.

The auger system 50 is pivotably mounted to the dispenser 30 and includes a chute 52 which is adjustably positionable over a grate 36 and thereby disposed over the opening 24 formed at a top of the bag 12. The auger system 50 includes a hopper 54 and auger compartment 56, whereby hopper 54 receives fill material received from a dump truck, trailer, or other transport means, and the fill material 102 is collected into the auger compartment 56. Once in the auger compartment 56, the fill material 102 is transported to the dispenser 30 by rotation of augers 58 and 60. In an alternate embodiment, the auger system 50 is lowered to dig directly into the support surface 100, instead of receiving fill material 102 into the hopper 54, whereby the auger system 50 brings fill material 102 in contact with auger 58 and therefrom to the bag 12. In this embodiment, fill material 102 is received directly from ground surface 100 directly in the path of the auger system 50, and alongside the path of the dispenser 30. The latter option is most readily foreseen when filling bags 12 near a river or stream bank, and soft mud/dirt along the bank is to be used for filling the bags 12. A brace 62 is attached between the auger system 50 and the dispenser 30 in order to maintain desired rigidity and support of the auger system 50.

A hitch 64 and a power take-off connection 66 is provided at a forward portion of the dispenser 30, whereby the dispenser 30 is towed and rotational energy is provided to a power transfer system (not shown) which, in turn, causes the augers 58 and 60 (when provided) to rotate, thereby depositing fill material 102 into bag 12, after passing through the grate 36 which is removably suspended over the bag guides 32 and also over the opening 24. The grate 36 sifts the fill material 102, as desired, and allows the bag 12 to receive the sifted fill material 102. In this fashion, fill material 102 is provided having a uniform consistency. As desired, the grate 36 may be removed in order to allow the use of coarser fill material 102 than would otherwise be able to pass through the grate 36.

Although the present invention can be deposited on-site and there remain in a stationary position, a preferred dispenser 30 has wheels 70, tracks (not shown), or skids (not shown). The example shown in FIGS. 3–5 is a trailer having a steering system (not shown) to be pulled by a tractor or a truck. However, other embodiments include, for example, a self-propelled vehicle (not shown). Likewise, a preferred auger system 50 has wheels, tracks (not shown), or skids (not shown). The dispenser 30 shown in FIGS. 3–5 has four wheels 70. The auger system 50 shown likewise has a wheel 70 attached on an outer side.

Bag 12 is preferably made of sturdy material such as, for example, plastic-impregnated cloth, or conventional sandbag material. A typical base 16 dimension for the bag 12 is six feet across, but any other dimension may be used.

Figure 6:
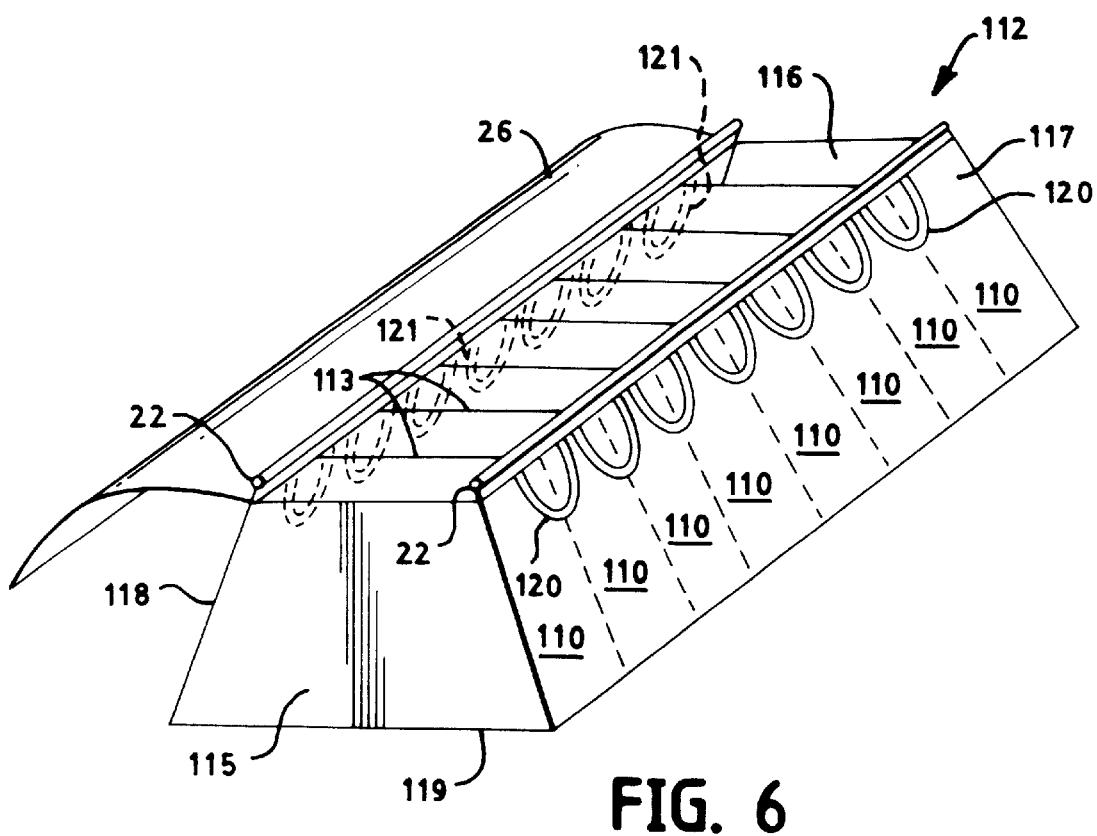
FIG. 6 is a perspective view of a alternative embodiment of the portable levee system bag of the present invention.

An alternative version of the portable levee system bag for the present invention is shown in FIG. 6. The portable levee system bag 112 shown in FIG. 6 is similar to the bag shown in FIG. 1 with some minor additions. Initially, as can be seen by referring to FIG. 6, a plurality of partitions walls 113 are provided to extend between the front wall 117 and the rear wall 118 of the portable levee system bag. The bag 112 is comprised of the front wall 117, rear wall 118, first side-wall 115, second side-wall 116, bottom portion 119 and top flap 26. As is found in the bag shown in FIG. 1 are upper edges 22 for the guide rail. Additionally, flap 26 is hingedly connected to the rear wall 118 such that it covers the top opening and entrance to each of the separate partitions openings 110. The bag 112 is also provided with a plurality of reinforced loops 120 and 121. Loops 120 are found on the top edge of the front wall 117 while reinforced loops 121 are found at the top edge of the rear wall 118 at the hinge point of flap 126 and rear wall 118. The portable levee system bag 112 shown in FIG. 6 is provided with the plurality of partition walls 113 to define each partition section 110 which is to be filled with sand or the like material. The bag 112 may be utilized as a heavy duty reenforced version which may be utilized to fill a breech in an existing earthen levee. The plurality of loops 120 and 121 may be utilized for ease of movement of the filled bag as a bag filled with sand or a like material may be quite heavy and not readily moveable without machinery. Thus, loops 120 and 121 may be secured by chains or possibly a pipe or an extended steel bar may be laced therethrough. Thus, the portable levee system bag 112 shown in FIG. 6 may be readily moved after filling.

The plurality of partitioned openings 110 provide a reinforced levee system bag such that should one of the partitions become punctured, the remaining partitions in bag 112 remain in position. Loops 120 and 121, as indicated as being reinforced, may be sewn to the wall material of the levee system bag 112 and may be comprised of plastics, nylons, or any strong reenforced material which is capable of supporting the high weight of the filled bags.

Figure 7:
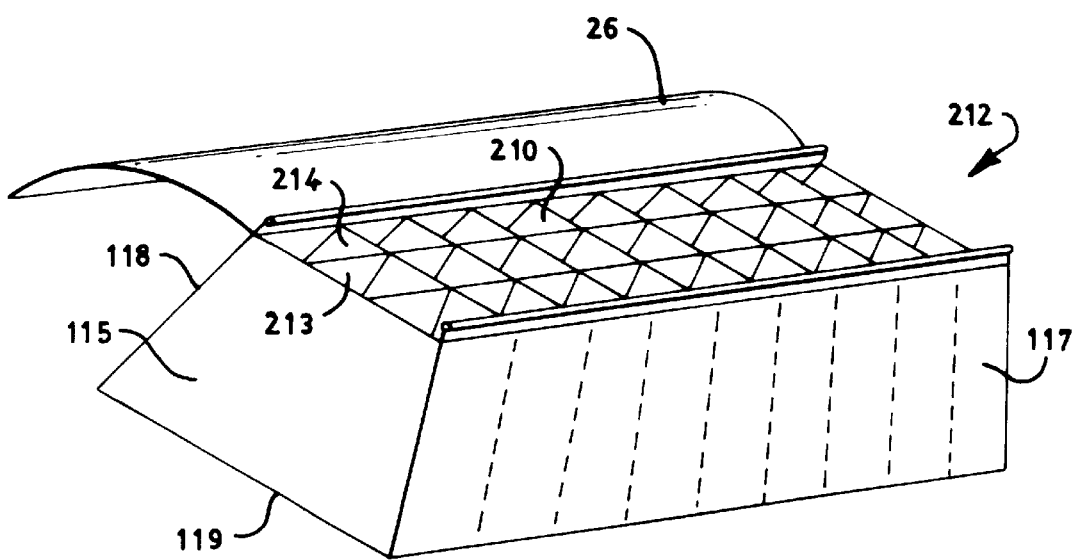
FIG. 7 is a perspective view of an additional alternative embodiment for a portable levee system bag for the present invention.

Turning to FIG. 7, an additional alternative embodiment of a portable levee system bag 212 is shown. This alternative embodiment may be utilized in military or other use. As is shown in FIG. 7, the bag 212 is partitioned into a plurality of sections 210. The sections are defined by lateral partitioning walls 213 and longitudinal partitioning walls 214 which may be subdivided to any desired width and depth. A significant benefit of the design of the levee system bag 212 shown in FIG. 7 is such that with the added number of partitioned sections 210, the bag becomes significantly more reinforced. Should any given partitioned section 210 become breached, the remaining portion of the bag will remain intact and fully capable of its initial function. Thus, in a potential military function, the alternative embodiment of the levee system bag 212 shown in FIG. 7 may be utilized so that any given partition 210 should they be breached by small arms fire or shrapnel would be contained in that smaller area and the remaining portion of the bag would remain intact for protection and use.

As can be seen from FIG. 7, the alternative embodiment of the levee system bag 212 is similarly comprised of a front wall 117, rear wall 118, side-walls 116 and 115 and bottom wall 119. Flap 26 may be provided for covering the entry to the partitioned sections 210 and is hinged to the top section of rear wall 118.

As previously mentioned, the embodiments 112 and 212 of the portable levee system bags of the present invention is desirably of a trapezoidal shape. Returning to FIG. 6, the dimensions of the bottom 119 of the portable levee system 112 is larger than the top flap 26. Further, front wall 117 and rear wall 118 are angled slightly toward each other so that they taper toward one another thereby forming definite trapezoids on either side-walls 116 and 115 as can be seen in the Figures.

Figure 8:
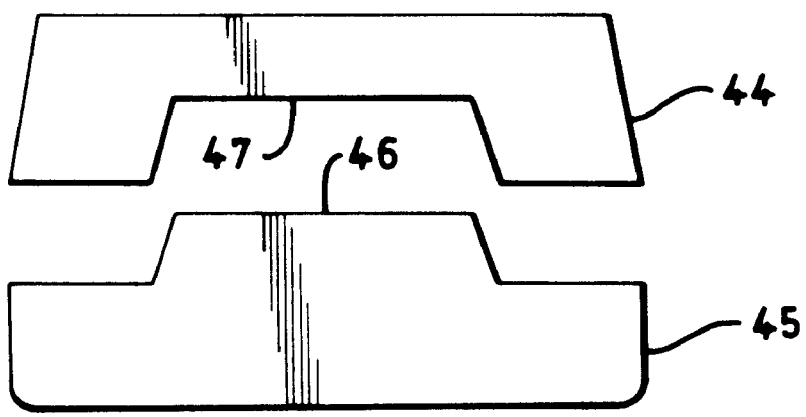
FIG. 8 is an end view of the male and female fastening clips for use on the portable levee system bags of the present invention.
Figure 9:
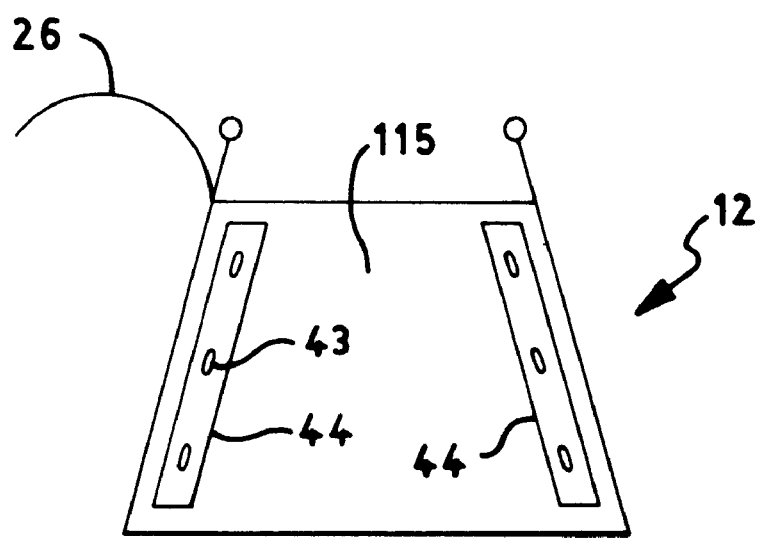
FIG. 9 is a side view of the portable levee system bag of the present invention wherein the attachment clips are affixed to the side panel of the bag.

Turning to FIG. 8, the attachment or fastening clips 44 and 45 of the present invention are shown. It may be necessary such that multiple bags may be fastened together so that the end panels 115 of adjacent bags are securely affixed together thereby securing the entire system of filled bags. This may be desirable due to stability purposes and the like. The fastening clips 44 and 45 as shown in FIG. 8 are comprised of a female fastening clip 44 and a male fastening clip 45. The female fastening clip has a channel 47 which will receive an extension 46 extending outward from the male fastening clip 45. In this manner, the opposing fastening clips may be securely affixed and press-fit together so that adjacent bags are securely held in place. The fastening clips as shown in FIG. 8 may be attached to the side panel 115 of the dispensing bag 12 through use of a stapling device or plastic wing nut 43. Thus, on one end panel 115 will be a row of female fastening clips 44 and on the adjacent bag which is secured next to it in the levee system or like structure will be male fastening clips 45. As shown in the drawings, the fastening clips may be placed on the end panel 115 and similarly the fastening clips may be affixed to the opposite side panel or to the bottom panel of the levee system bag. In this manner, the entire structure may be secured together to provide a strong levee system which is comprised of a plurality of portable levee system bags, all of which are interconnected together for strength and stability purposes. Alternative fastening means may be readily used and full within the present teachings.

A method for providing a levee consists of the following steps:

1) dispensing a bag 12 from a container 40;
2) feeding the bag 12 onto guide rails 34;
3) lowering a base 16 of the bag 12 to a support surface 100;
4) expanding the bag 12 from a collapsed storage state;
5) disposing an opening 24 of the bag 12 into a condition to receive fill material 102;
6) transporting the fill material 102 via an auger system 50 to;
7) positioning a chute 52 of the auger system 50 above a grate 36;
8) depositing the fill material 102 onto the grate 36;
9) sifting the fill material 102 through the grate 36;
10) depositing the sifted fill material 102 into the bag 12 through the opening 24;
11) moving the dispenser 30 along a path of intended travel, thereby providing continuous expansion of the bag 12 for continued receiving of fill material 102; and,
12) replacing a filled bag 12 from an empty container 40 of the dispenser 30 with a new, collapsibly stored, bag 12, whereby the new bag 12 is disposed to abut or otherwise rest, as desired, in proximity to said filled bag 12.

The detailed description is given primarily for clearness of understanding and no unnecessary limitations are to be understood therefrom for modifications will become obvious to those skilled in the art upon reading this disclosure and may be made without departing from the spirit of the invention and scope of the appended claims.

What is claimed is:

1. A portable levee system bag comprising: a front wall, a rear wall, first and second spaced trapezoidal shaped side walls attached at opposite ends to said rear wall and said front wall, and a bottom wall; at least one partition wall in the interior of said levee system bag extending a width or a length of said bag separating said bag into at least two compartments; and guides disposed along upper edges of said rear wall and said front wall, said guides connectable to a filling device and holding said bag in position for filling.

2. The portable levee system bag of claim 1 wherein said at least one partitioning wall is comprised of least one longitudinally extending partition wall and at least one intersecting laterally extending partition wall.

3. The portable levee system bag of claim 1 further comprising a plurality of loops formed on the exterior of said levee system bag.

4. The portable levee system bag of claim 3 wherein said plurality of loops are comprised of a first plurality of loops formed on the top section of said front wall and a second plurality of loops formed on the top section of said rear wall.

5. The portable levee system of claim 4 wherein a flap is hingedly connected to said rear wall and further wherein said second plurality of loops are attached to said bag near said hinge.

6. The portable levee system bag of claim 1 further comprising at least one fastening clip on the exterior of said bag, said fastening clip securable with a fastening clip on an adjacent bag.

7. The portable levee system bag of claim 6 wherein said fastening clip is comprised of a releasably lockable fastening clip.

8. The portable levee system bag of claim 6 wherein said at least one fastening clip is securely affixed to said first side wall.

9. The portable levee system bag of claim 6 further comprising at least one fastening clip affixed to said first side wall and at least one fastening clip affixed to said second side wall.

10. The portable levee system bag of claim 9 further comprising at least one fastening clip on said bottom section.

11. A portable levee system bag, comprising:
a first and a second spaced side wall attached at opposite ends to a front wall and a rear wall, and a bottom wall; a longitudinally extending partition wall and at least one intersecting laterally extending partition wall; guides disposed along upper edges of said rear wall and said front wall, said guides connectable to a filling device and holding said bag in position for filling; and
at least one fastening clip on an exterior surface of said bag.

12. The portable levee system bag of claim 11 further comprising a plurality of loops formed on an exterior surface of said levee system bag.

13. The portable levee system bag of claim 12 wherein said plurality of loops are comprised of a first plurality of loops formed on a top section of said front wall and a second plurality of loops formed on a top section of said rear wall.

14. The portable levee system bag of claim 11 wherein said fastening clip is mutually engagable with a fastening clip from an adjacent portable levee system bag.

15. The portable levee system bag of claim 14 wherein said fastening clip is a releasably lockable fastening clip.

16. The portable levee system bag of claim 11 further comprising at least one fastening clip on said bottom section of said bag.

17. A portable levee system bag comprising; a first and a second spaced side wall attached at opposed ends to a front and a rear wall, and a bottom wall, said first and second side wall, said rear wall and said front wall forming an interior portion thereof, said interior portion having a plurality of partitioning walls located therein, said partitioning walls forming a plurality of partitioned sections within said bag; guides disposed along upper edges of said rear wall and said front wall, said guides connectable to a filling device and holding said bag in position for filling; and a plurality of releaseable fastening clips located on an exterior surface thereof, said fastening clips fastening clips releasably engagable to fastening clips located on an adjacent portable levee system bag.

* * * * *